US012250548B2

United States Patent
Maria

(10) Patent No.: US 12,250,548 B2
(45) Date of Patent: Mar. 11, 2025

(54) CONFIGURABLE EXTENSION OF PRIVATE MOBILE NETWORK ACCESS

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 607 days.

(21) Appl. No.: 17/522,715

(22) Filed: Nov. 9, 2021

(65) Prior Publication Data
US 2023/0142951 A1    May 11, 2023

(51) Int. Cl.
H04W 12/086    (2021.01)
H04W 72/04     (2023.01)
H04W 72/20     (2023.01)
H04W 76/11     (2018.01)
H04W 84/04     (2009.01)

(52) U.S. Cl.
CPC ......... H04W 12/086 (2021.01); H04W 72/20 (2023.01); *H04W 84/045* (2013.01)

(58) Field of Classification Search
CPC ... H04W 12/08; H04W 12/086; H04W 72/20; H04W 84/045
See application file for complete search history.

(56) References Cited

U.S. PATENT DOCUMENTS

| | | | | |
|---|---|---|---|---|
| 2015/0072695 | A1* | 3/2015 | Isobe | H04W 4/20 455/445 |
| 2020/0366677 | A1* | 11/2020 | Draznin | H04L 63/0853 |
| 2022/0038431 | A1* | 2/2022 | Macy | G08B 25/08 |
| 2022/0201593 | A1* | 6/2022 | Baek | H04W 76/10 |
| 2022/0360580 | A1* | 11/2022 | Mishra | H04W 12/009 |
| 2022/0417757 | A1* | 12/2022 | Gupta | H04W 24/02 |

* cited by examiner

*Primary Examiner* — Liton Miah
(74) *Attorney, Agent, or Firm* — Guntin & Gust, PLC; Mark Wilinski

(57) ABSTRACT

Extending user equipment (UE) access to resources of a private network via a private core network component (PCNC) and a carrier core network component (CCNC) is disclosed. An allocation component comprised in a carrier core network can receive extension information from a first PCNC that can enable determining a connection between the first PCNC and another core network component that can extend resource access. In an embodiment, the other core network component can be the CCNC resulting in the UE having access via the CCNC and the first PCNC. In another embodiment, the other core network component can be a second PCNC resulting in the UE having access to the resources via the second PCNC, the CCNC, and the first PCNC. In a further embodiment, extending access can result in the UE having access to the resources via a second PCNC, a plurality of CCNCs, and the first PCNC.

20 Claims, 10 Drawing Sheets

CONFIGURABLE EXTENSION OF PRIVATE MOBILE NETWORK ACCESS

TECHNICAL FIELD

The disclosed subject matter relates to extending access to a private mobile network, and, more particularly, to configuring carrier core network resources to support extension of private mobile network access.

BACKGROUND

Conventionally, mobile communications networks were operated by mobile network operators (MNOs), e.g., carrier networks were conventionally operated by a carrier entity, often simply referred to as a carrier. Carrier networks are typically considered public networks that can be accessed according to an agreement between a member of the public and a carrier. Carrier networks can be contrasted to private networks that are typically not available for use by a member of the general public. The 3rd Generation Partnership Project (3GPP), a mobile telecommunications standards organization, can refer to typical private networks as "non-public networks" that can be networks that use licensed, shared, or unlicensed wireless spectrum to support cellular networking base station, small cells, and other Radio Access Network (RAN) infrastructure to transmit voice and data to edge devices, including smart phones, embedded modules, routers, and gateways, based on the user device being affiliated with a non-public entity. Private cellular networks can, for example, be deployed by companies, enterprises, facilities such as stadiums, airports, etc. Where a private network can use cellular technologies that can be compatible with public cellular networks, these private networks can typically offer coverage, security, and other capabilities similar to those of carrier networks, but the private network can be tailored to the private entity's specifications. Often, the same types of network equipment employed by carrier networks can also be deployed in a private network, for example, baseband units (BBUs), RAN components, core network components, etc. In this regard, a carrier network can comprise a carrier core component that can be the same or similar type of core network component deployed in a private network, e.g., as a private core component, for example a carrier can deploy a carrier evolved packet core (EPC) component and a private network can deploy a private EPC component that can be the same or similar to the carrier EPC component. As such, private networks can operate the same or similar to a public networks operated by an MNO. Edge devices can use wireless spectrum to transmit data to nearby cellular base stations, access points and other network infrastructure of the private network without necessarily relying on a carrier network. The private network infrastructure can then move this data to an enterprise's internal network, for example, over a secured wired connection, wireless connection, fiber optic connection, etc. Using this secured connection, data from the edge devices can then be sent to/from various cloud services and applications. Public, e.g., carrier, and private networks can differ in regard to who has a license or priority access to corresponding wireless spectrum, who owns/operates network infrastructure, e.g., BBUs, core components, etc., and which users are considered for access to a network, where typically private networks are owned, operated, or have some level of priority access to, private organization network resources, spectrum, etc.

Typically, modern private networks can be operated in isolation or with dedicated access to a carrier network. In isolation is meant to convey that the private network can allow approved users of the private network access to resources of the private network. As an example, a large airplane manufacturer can deploy a private network that can support employees approved devices, e.g., devices with a privately issued subscriber identity module (SIM) or privately issued electronic SIM (eSIM), etc., and can enable those devices to access data on a corporate network of the plane manufacturer but the private SIM/eSIM, hereinafter simply SIM for clarity and brevity, can be unable to access another network, e.g., a carrier network or another private network, with those same privately issued SIMs. In these situations, a second carrier issued SIM can enable the device to then access the carrier network resources. As such, this type of private network can be regarded as being isolated from other public or private networks. Where a private network is configured in a non-isolated configuration to allow an authorized devices to use more than one network, for example a private network and a carrier network, etc., a dedicated connection, typically a hard connection, e.g., a hard wire or optical fiber connection, can be instituted between a private network core component and a carrier network core component. However, this conventional use of dedicated connections between a private network and other networks, e.g., a carrier network or other private network, can be costly and/or complicated to set up and maintain. Moreover, the dedicated connection can typically be again costly and/or complicated to update, change, modify, etc., leading to a conclusion that conventional dedicated private-other network connections as being inflexible. As an increasing number of private networks are being deployed, to leverage advantages such as delivering better wireless coverage than Wi-Fi over large geographic areas, providing tailored coverage to designated geographic areas that can be less ideally served by a public network, providing coverage underground or inside buildings, etc., enabling improved security over typical public wireless networks, such as implementing default data encryption between private network and approved user equipment (UEs), etc., lower costs of private network administration, maintenance, etc., that a carrier network, etc., increasing the flexibility and improving cost/complexity aspects can advance the state of the art in wireless network technologies.

DETAILED DESCRIPTION

Figure 1:
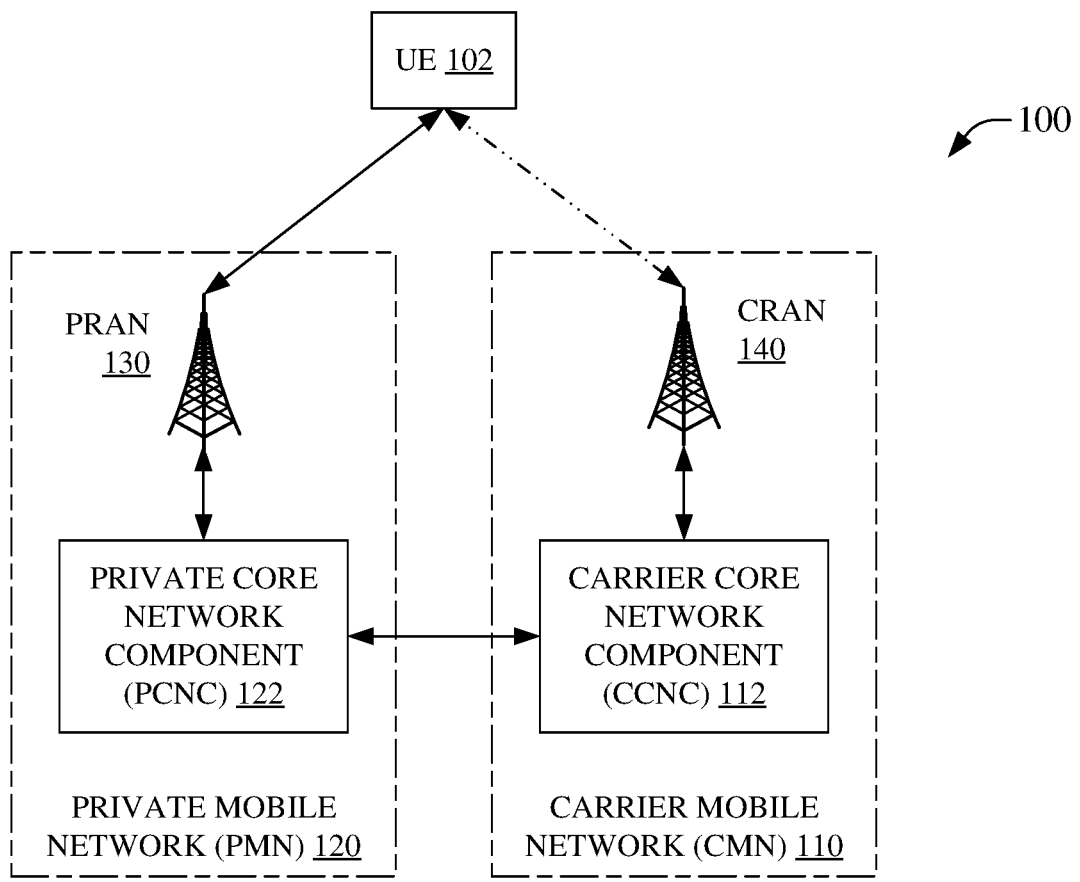
FIG. 1 is an illustration of an example system that can facilitate configurable extension of private mobile network access, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Modern mobile communications networks can be operated by mobile network operators (MNOs), e.g., a carrier(s), typically open to contracting members of the general public, or by private entities as a private network that can typically support devices authorized by a non-public entity. Carrier networks are typically considered public networks that can be accessed according to an agreement between a member of the public and a carrier. Carrier networks can be contrasted to private networks that are typically not available for use by a member of the general public. The 3rd Generation Partnership Project (3GPP), a mobile telecommunications standards organization, can refer to typical private networks as "non-public networks" that can be networks that use licensed, shared, or unlicensed wireless spectrum to support cellular networking base station, small cells, and other Radio Access Network (RAN) infrastructure to transmit voice and data to edge devices, including smart phones, embedded modules, routers, and gateways, based on the user device being affiliated with a non-public entity. Private cellular networks can, for example, be deployed by companies, enterprises, facilities such as stadiums, airports, etc.

A private network can use cellular technologies that can be compatible with public cellular networks, these private networks can typically offer coverage, security, and other capabilities similar to those of carrier networks, but the private network can be tailored to the private entity's specifications. As such, the same types of network equipment employed by carrier networks can also be deployed in a private network, for example, baseband units (BBUs), RAN components, core network components, etc. In this regard, a carrier network can comprise a carrier core component that can be the same or similar type of core network component deployed in a private network, e.g., as a private core network component, for example a carrier can deploy a carrier evolved packet core (EPC) component and a private network can deploy a private EPC component that can be the same or similar to the carrier EPC component. Carrier and private networks can differ in regard to who has a license or priority access to corresponding wireless spectrum, who owns/operates network infrastructure, e.g., BBUs, core components, etc., and which users are considered for access to a network, where typically private networks are owned, operated, or have some level of priority access to, private organization network resources, spectrum, etc., that are usually not accessible via only a carrier core component.

Typically, modern private networks can be operated in isolation or with dedicated access to a carrier network. An isolated private network can be a private network that can allow only approved users of the private network to access resources of the private network, e.g., a SIM issued by a private enterprise can permit a UE to access resources of a private network, but the same SIM would typically not enable the UE to access a carrier network or other private network. It is noted that a SIM can be exchanged for a carrier-issued SIM, a UE can support dual SIMs, etc., to enable the UE to then access both the private network resources, e.g., based on a private-issued SIM, and the carrier network resources based on a carrier-issued SIM. These types of private networks can be regarded as being generally isolated from other public or private networks where an additional SIM is not employed. Alternatively, a private network can be configured in a non-isolated configuration to allow UEs to use a SIM to access more than one network, for example a private network and a carrier network, etc. In non-isolate private network configurations, a dedicated connection, typically a hard connection, e.g., a hard wire or optical fiber connection, can be established between a private network core component and a carrier network core component to support use of the SIM for UE access to both the private and carrier networks. However, this use of dedicated connections between a private network and other networks, e.g., a carrier network or other private network, can be costly and/or complicated to set up and maintain. Moreover, the dedicated connection can typically be costly and/or complicated to update, change, modify, etc., leading to a conclusion that conventional dedicated private-to-other network connections as not being convenient for adaptation. As an increasing number of private networks are being deployed, to leverage advantages such as delivering better wireless coverage than Wi-Fi over large geographic areas, providing tailored coverage to designated geographic areas that can be less ideally served by a public network, providing coverage underground or inside buildings, etc., enabling improved security over typical public wireless networks, such as implementing default data encryption between private network and approved user equipment (UEs), etc., lower costs of private network administration, maintenance, etc., that a carrier network, etc., increasing the flexibility of private networks and improving cost/complexity aspects of adapting accessibility to or between private networks, carrier networks, or combinations thereof, can advance the state of the art in wireless network technologies.

In an embodiment of the presently disclosed subject matter, a carrier core network component (CCNC) can support extending access to a private core network component (PCNC). A CCNC can be connected to a PCNC to enable a UE to transition between a private mobile network (PMC) connection and a carrier mobile network (CMN) connection, e.g., via transitioning to/from a private radio access network (PRAN) component to/from a carrier radio access network (CRAN). As an example, a UE can have SIM(s) that enable access to the PMN resources via the PRAN and PCNC, and to the CMN via the CRAN and CCNC such that the UE can access either the PMN resources or the CMN resources, however, conventionally the UE cannot access the PMN resources via the CMN. The disclosed subject matter can introduce a CCNC that can be enabled to provide access to the PMN resources via the CMN. In this embodiment, a UE connected to the CCNC, e.g., via CRAN, can access PMN resources via the connection between the CCNC and the PCNC.

In another embodiment, the CCNC can enable connection to more than one PCNC. In this embodiment, a UE connected to a first PCNC can access resources connected to the second PCNC via a connection provisioned by the CCNC, e.g., access can flow between the first and second PCNC via the CCNC. In further embodiments, the CCNC can support access to the example resources connected to the second PCNC via either, or both, the first PCNC and/or the CCNC. These embodiments can logically enlarge a PMN from a first state containing the first PCNC to a second state comprising the first PCNC, the second PCNC, the CCNC, or combinations thereof. As such, unlike conventional PMNs, access to resources connected to a first PCNC can be accessed from other PCNCs, CCNCs, or combinations thereof. As previously noted, conventional non-isolated private networks typically require a dedicated configuration of a hard connection between a PCNC and a CCNC that is generally not flexible. In contrast, the disclosed subject matter can enable flexible connectivity by implementing a CCNC that can configure connections based on input from a private entity. As such, connections between different PCNCs does not need to be a dedicated hard connection between the different PCNCs, but rather can be a readily configurable connection via a CCNC. This has the advantage of leveraging existing hard connections embodied in the mesh of connections between the many public and private network components already in existence rather than manually configuring a dedicated connection. In this regard, the CCNC can dynamically determine, establish, adapt, update, truncate, etc., connections that can enable communications from a UE to resources connected to a PCNC in accord with specifications indicated by a private entity corresponding to the PCNC with other PCNCs, CCNCs, etc. In some embodiments, access can be extended across, or with, multiple CCNCs, as well. As an example, a first CCNC can provision access to resource connected to a PCNC via a second CCNC, such as communicating provisioning information to a second-carrier core component from a first-carrier core component such that a UE can access the resource of the PCNC while connected to the second CCNC.

In embodiments, a CCNC dynamically managing connections to a PCNC can be in accord with rules, parameters, etc., indicated for the connection by an entity associated with control of the PCNC. In an example, an entity can operate a PMC and can provide a CCNC information relating to UEs authorized to access resources connected to a PCNC of the PMC. This can result in the CCNC provisioning a connection to the PCNC that can enable a UE on a CMN associated with the CCNC to access the PCNC related resources while still on the CMN and simultaneously rejecting access to the resources for non-authorized UEs also on the CMN. As such, the example CCNC can configure security, connectivity, provisioning, etc., to accommodate the communication of a UE with the PCNC via the CCNC. Moreover, the PCNC can update the configuration of a connection by communication updated information to the CCNC. In some embodiments, a new component can be deployed in a carrier core network, e.g., allocation component 250, etc., that can determine connections, select a determined connection that satisfies requirements of a private network entity, provision the selected connection, update the selected connection, etc., to effectively expand access to a PMN. This can be performed with much greater speed, efficiency, accuracy, and with far less human involvement, than the conventional technique of determining and implementing dedicated connections between PCNCs and other PCNCs and/or CCNCs. As an example, rather than leasing a dedicated optical fiber connection between a first PCNC located in Dallas and a second PCNC located in Houston, whereby information can flow directly between the first and second PCNCs to enable access to connected private entity resources, a connection can alternatively be dynamically implemented via a CCNC to connect the first and second PCNCs. In this example, the CCNC can provision the connection to have indicated security protocols, allow access to only an indicated group of UEs, etc., that are indicated by a private entity affiliated with the PCNCs. In this example, access can be viewed as being extended from the first PCNC to the second PCNC via the CCNC. This example can be extended to also permit access to the example resources for the permitted UEs via the CCNC or even via other CCNCs or PCNCs. For example, the first CCNC can be located in Dallas and access can be dynamically extended to a third PCNC in Paris, France, via a second CCNC located in Europe. In some embodiments, one or more CCNC can comprise an allocator component. As such, in the preceding example, the first CCNC in Dallas can comprise a first allocator component and the second CCNC in Europe can comprise a second allocator component that can communicate with the firs allocator component to facilitate extending access to the resources of the first PCNC to the third PCNC, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate configurable extension of private mobile network access, in accordance with aspects of the subject disclosure. System 100 can comprise private core network component (PCNC) 122 that can be connected to a private radio access network (PRAN). User equipment (UE) 102 can access private mobile network (PMN) 120 via PRAN 130 and PCNC 122. In this regard, UE 102 can access resources connected to PCNC 122, for example a service, application, data, etc., via a server, data store, etc., connected to PCNC 122. In some embodiments resources connected to PCNC 122 can be comprised in PMN 120. In some embodiments, resources connected to PCNC 122 can be external to PMN 120. It is noted that resources connected to PCNC 122 can be comprised in PCNC 122, for example a private core network service, etc., can be directly connected to PCNC 122, for example a data store connected to PCNC 122, or can be connected to PCNC 122 via other components, for example a server connected to PCNC 122 via a local area network (LAN), etc.

System 100 can further comprise carrier core network component (CCNC) 112 that can be connected to PCNC 122, for example via a data network, direct hard connection, such as a fiber optic cable, copper wire, etc., or via nearly any other communicative coupling. CCNC 112 can be connected to carrier radio access network (CRAN) 140, which can be a conventional radio access network (RAN) operated by a carrier. CCNC 112 can enable expansion of access to resources connected to PCNC 122, hereinafter typically referred to as 'resources' for the sake of clarity and brevity. In this regard, where UE 102 is connected to PRAN 130, UE 102 can access resources via PCNC 122, and where UE 102 transition connectivity from PRAN 130 to CRAN 140, UE 102 can continue to access the resources associated with PCNC 122 via CCNC 112 and PCNC 122. In embodiments, carrier mobile network 110 can comprise CCNC 112 and CRAN 140. As such, in contrast to a conventional isolate private network, UE 102 can access resources via PCNC 122 whether connected to PRAN 130 or CRAN 140.

In embodiments, where CCNC 112 can enable extension of access to resources associated with PCNC 122 via the connection of CCNC 112 and PCNC 122, the access can be in accord with rules, settings, etc., dictated by a private entity corresponding to PCNC 122. In an example, an entity can indicate identifiers, such as a Public Land Mobile Network (PLMN) identifier (PLMN-ID), etc., that can be associated with SIMs for UEs that can be permitted to access resources affiliated with PCNC 122. In this example, the identifiers can be provided to CCNC 112, such as via PCNC 122, etc., such that an identifier provided from UE 102 to CRAN 140 and passed to CCNC 112 can be verified, for example by CCNC 112, etc., as being permitted to access the resources via PCNC 122 before UE 102 is permitted to route to PCNC 122 via CCNC 112. This example can be expanded on, such as the routing of traffic from UE 102 to PCNC 122 being via a tunneling protocol through CCNC 112 that can be dictated by a private entity affiliated with PCNC 122. Other examples can include the connection of UE 102 to PCNC 122 via CCNC 112 as complying with indicated authentication protocols, indicated security measures, etc.

Figure 2:
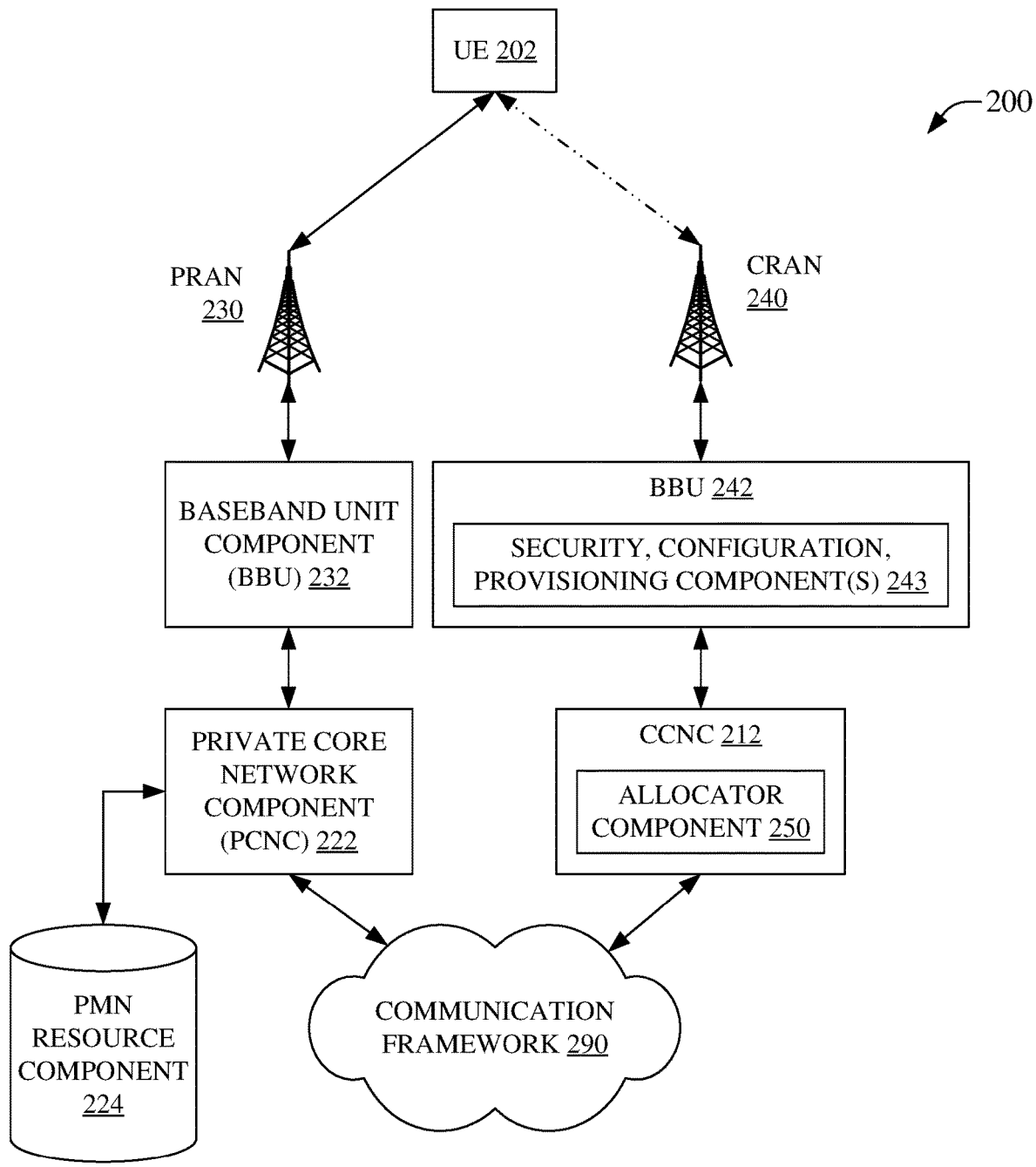
FIG. 2 is an illustration of an example system that can facilitate extension of private mobile network access supporting access to private resources and a customizable configuration, in accordance with aspects of the subject disclosure.

FIG. 2 is an illustration of a system 200, which can enable extension of private mobile network access supporting access to private resources and a customizable configuration, in accordance with aspects of the subject disclosure. System 200 can comprise PCNC 222 that can be connected to PRAN 230 via a baseband unit, e.g., baseband unit component (BBU) 232. UE 202 can access PCNC 222 via PRAN 230 and BBU 232. Resources can be accessed via PMN resource component 224 that can be connected to PCNC 222. PMN resource component 224, in some embodiments, can be comprised in PCNC 222, while in other embodiments, PMN resource component 224 can be located local to PCNC 222 or remotely from PCNC 222.

System 200 can further comprise CCNC 212 that can be connected to PCNC 222, for example, via a communication framework 290, e.g., a data network, direct hard connection, such as a fiber optic cable, copper wire, etc., or via nearly any other communicative coupling. CCNC 212 can be connected to CRAN 240 via BBU 242. CCNC 212 can enable expansion of access to resources at PMN resource component 224 via communication framework 290 and PCNC 222. In this regard, where UE 202 is connected to PRAN 230, UE 202 can access PMN resource component 224 via BBU 232 and PCNC 222, and where UE 202 is connected to CRAN 240, UE 202 can continue to access PMN resource component 224 via BBU 242, CCNC 212, communication framework 290, and PCNC 222.

In embodiments, where CCNC 212 can enable extension of access to resources associated with PCNC 222 via the connection of CCNC 212 and PCNC 222, the access can be in accord with rules, settings, etc., dictated by a private entity corresponding to PCNC 222. In an embodiment, BBU 242 can comprise security, configuration, provisioning component(s) 243 that can be instructed to enable access to UEs, e.g., UE 202, in compliance with instructions from PCNC 222 that reflect a corresponding private entity's rules, settings, etc. In some embodiments, security, configuration, provisioning component(s) 243 can also be located in CCNC 212, though this is not illustrated for the sake of clarity and brevity. As such, BBU 242, via security, configuration, provisioning component(s) 243, can, for example, filter UEs attempting to connect to PCNC 222 based on a UE provided identifier that can be compared with private entity indicated allowed identifiers. This example can illustrate allowing permitted UEs, e.g., based on a matching identifier, to be connected to CCNC 212 and then to PCNC 222, via communication framework 290, to access PMN resource component 224, by filtering UEs at BBU 243.

In embodiments, CCNC 212 can comprise allocator component 250 that can facilitate extending access from PCNC 222 via CCNC 212. Allocator component 250 can be a new component integrated into an existing carrier core network, for example, via inclusion in CCNC 212 or some other carrier core network component. Allocator component can receive information from a private entity, for example, via inputs communicated via PCNC 222, that can then be employed to determine programming of security, configuration, provisioning component(s) 243. Allocator component 250 can simultaneously support one or more extensions of one or more private networks via CCNC 212. In contrast to a private entity designing and implementing dedicated connections between core networks to support extending access to resources, allocator component 250 can provide an interface for a private entity to extend access via a carrier network, for example, enabling UE 202 to access resources of a private network via PMN resource component 224, etc., via CCNC 212.

Figure 3:
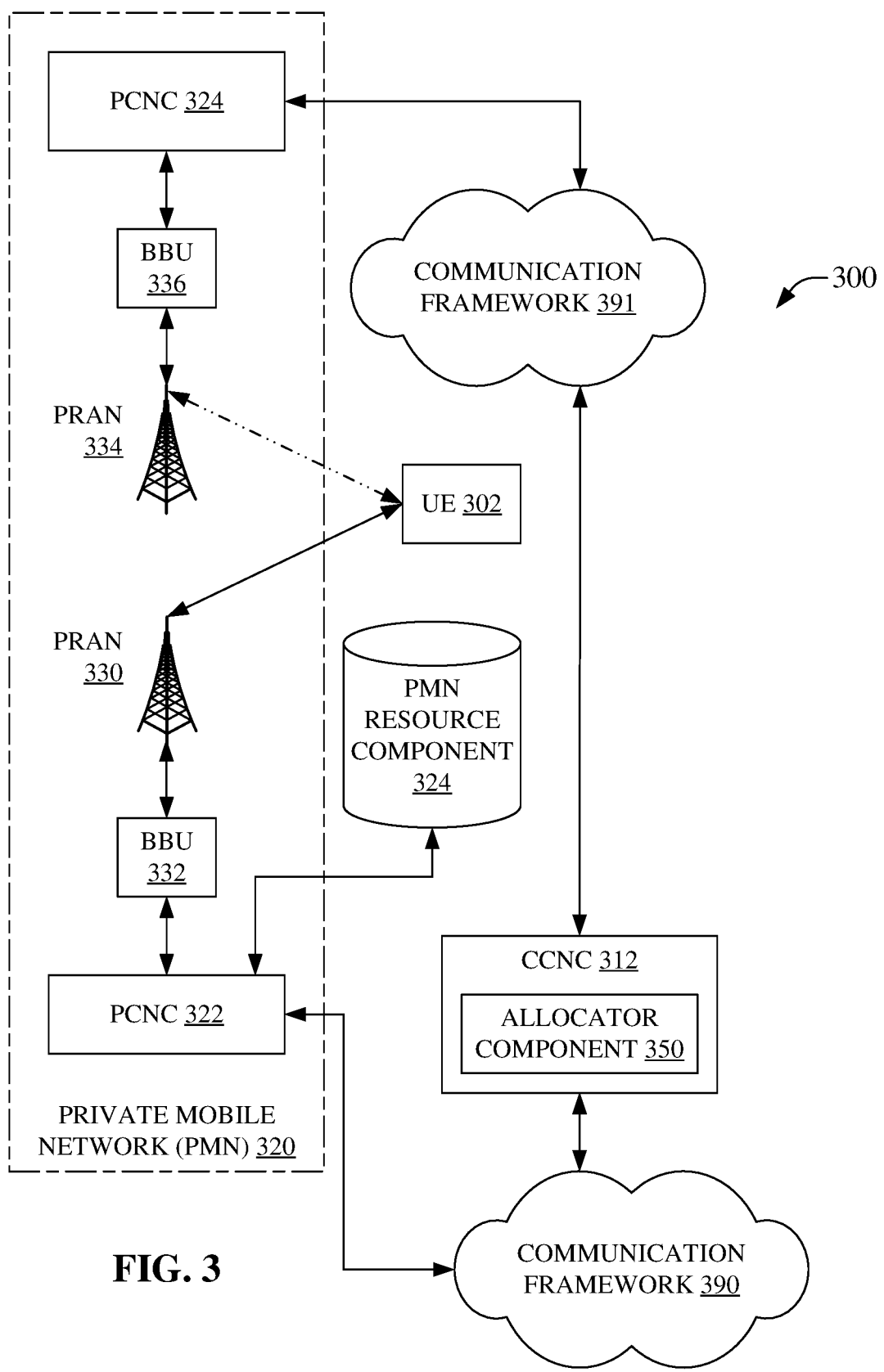
FIG. 3 is an illustration of an example system that can enable configurable extension of private mobile network access between different private core network components, in accordance with aspects of the subject disclosure.

FIG. 3 is an illustration of a system 300, which can facilitate configurable extension of private mobile network access between different private core network components, in accordance with aspects of the subject disclosure. System 300 can comprise PCNC 322 that can be connected to PRAN 330 via BBU 332. UE 302 can access PCNC 322 via PRAN 330 and BBU 332. Resources can be accessed via PMN resource component 324 that can be connected to PCNC 322. PMN resource component 324, in some embodiments, can be comprised in PCNC 322, while in other embodiments, PMN resource component 324 can be located local to PCNC 322 or remotely from PCNC 322. In an example first state, PMN 320 can comprise PRAN 330, BBU 332 and PCNC 322. System 300 can further comprise an additional private core network, e.g., PCNC 324 that can be connected to PRAN 334 via BBU 336. In the example first state, PMN 320 can exclude PRAN 334, BBU 336, and PCNC 324.

System 300 can further comprise CCNC 312 that can be connected to PCNC 322, for example, via a communication framework 390. CCNC 312 can enable expansion of access to resources at PMN resource component 324 via communication framework 390 and PCNC 322. In this regard, where UE 302 is connected to PRAN 330, UE 302 can access PMN resource component 324 via BBU 332 and PCNC 322. As part of CCNC 312 extending access to PMN resource component 324, allocator component 350 can establish a connection to PCNC 324 via communication framework 391. In some embodiments, communication framework 390 and 391 can be the same communication framework, while in other embodiments they can be different communication frameworks.

The connection between PCNC 324 and CCNC 312 in accord with determinations made via allocator component 350 can result in UE 302 being able to access PMN resource component 324, for example, via PRAN 334, BBU 336, PCNC 324, communication framework 391, CCNC 312, communication framework 390, and PCNC 322. In this example, PMN 320 can be regarded as being expanded from comprising PRAN 330, BBU 332, and PCNC 322 to also comprising PRAN 334, BBU 336, and PCNC 324. As has been previously noted, the determination, provisioning, maintenance, and updating of connections between PCNC 324 and CCNC 312 can be managed by allocator component 350, e.g., an operator of PMN 320 can indicate an updated security protocol, an updated list of UE identifiers that are allowed to have access, etc., to allocator component 350 that can cause allocator component 350 to update connectivity to PCNC 324 accordingly. In an example, UE 302 can be an employee mobile device having affiliated with an identifier that can initially be permitted to access PMN resource component 324, but, after the employee retires from employment, an allowed identifier list can be updated, resulting in allocator component 350 not permitting UE 302 to access PMN resource component 324 via CCNC 312. In this example, it is also likely that access would be similarly rescinded by the private entity at PCNC 322. In another example, a multi-national enterprise can desire to regionally control access to private corporate resources, whereby, allocator component 350 can be instructed to permit access by UE 302 via CCNC 312 to PCNC 322 only when UE 302 is located in a first country. In this example, where PCNC 324 is located in a second country, allocator component 350 can deny access to PCNC 322 by UE 302. It is further noted, in this example, that other UEs may not be so regionally restricted, for example where UE 302 is affiliated with a low-level employee and a second UE is affiliated with a high-level executive employee, it can be desirable to limit UE 302 access but not to limit the second UE's access, wherein, for this example, allocator component 350 denies UE 302 access via PCNC 324 located in the second country, while the second UE is permitted access via PCNC 324 in the second country.

Figure 4:
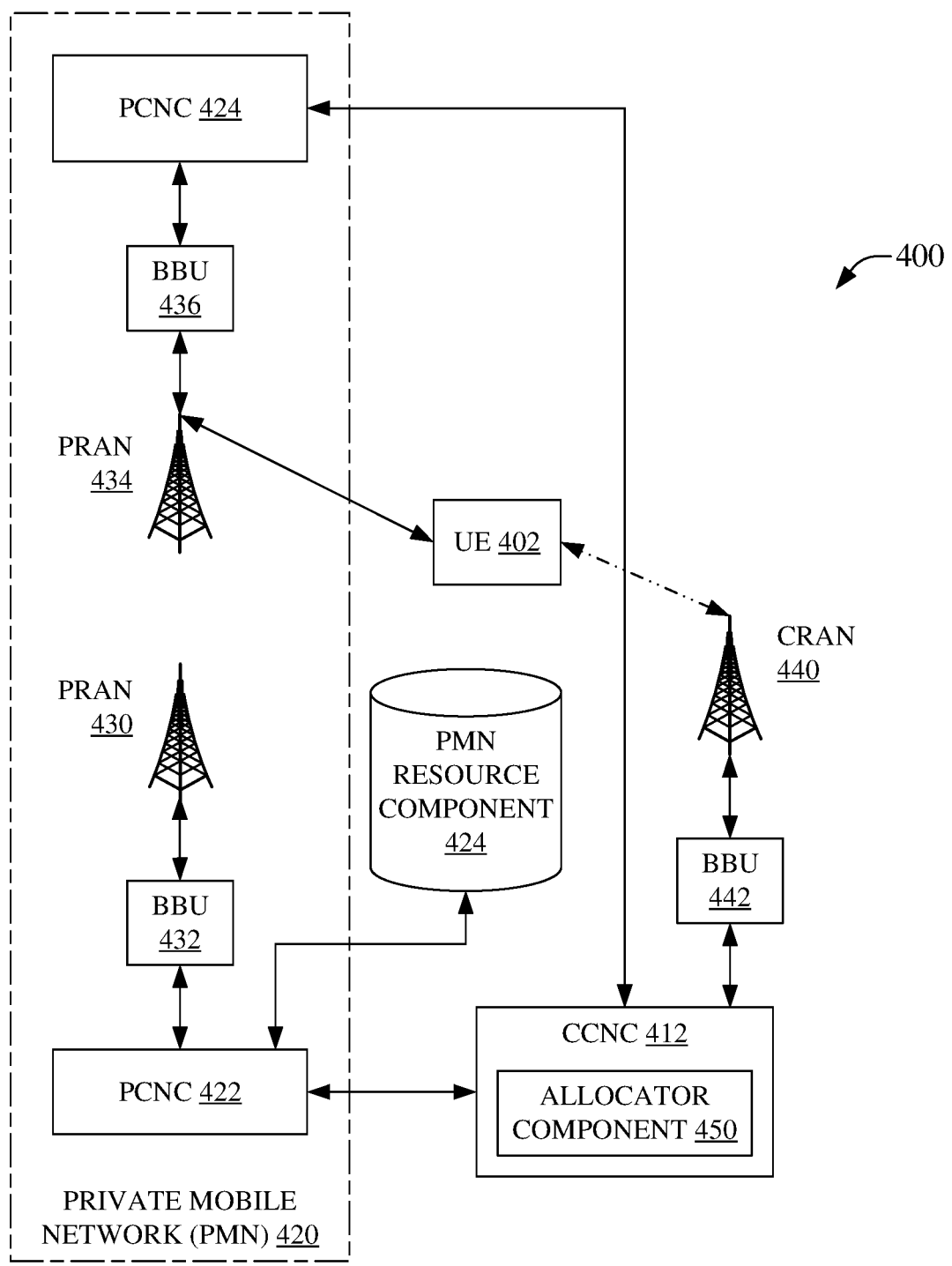
FIG. 4 illustrates an example system that can facilitate configurable extension of private mobile network access between different private and carrier core network components, in accordance with aspects of the subject disclosure.

FIG. 4 is an illustration of a system 400, which can enable configurable extension of private mobile network access between different private and carrier core network components, in accordance with aspects of the subject disclosure. System 400 can comprise PCNC 422 that can be connected to PRAN 430 via BBU 432. Similarly, system 400 can comprise PCNC 424 that can be connected to PRAN 434 via BBU 436. UE 402 can access PCNC 424 via PRAN 434 and BBU 436. Resources can be accessed via PMN resource component 424 that can be connected to PCNC 422, e.g., via a connection implemented by allocator component 450, wherein the connection can connect PCNC 424 to PCNC 422 via CCNC 412, etc. PMN resource component 424, in some embodiments, can be comprised in PCNC 422, while in other embodiments, PMN resource component 424 can be located local to PCNC 422 or remotely from PCNC 422. Accordingly access to resources via PMN resource component 424 can have been extended via CCNC 412 by allocator component 450 and PMN 420 can be regarded as comprising PRAN 430 and 434, BBU 432 and 436, PCNC 422 and 424.

System 400 can further comprise CRAN 440 and BBU 442, which can be connected to CCNC 412. CCNC 412 can further expand access to resources at PMN resource component 424 via CRAN 440. In this regard, where UE 402 is connected to PRAN 434, UE 402 can access PMN resource component 424 via PCNC 424, CCNC 412, and PCNC 422, and where UE 402 is connected to CRAN 440, UE 402 can continue to access PMN resource component 424 via CCNC 412 and PCNC 422. As before, in embodiments, where CCNC 412 can enable extension of access to resources associated with PCNC 422 via the connection of CRAN 440 and/or PRAN 434, the access can be in accord with rules, settings, etc., dictated by a private entity corresponding to PCNC 422. Where access is extended to CRAN 440, PMN 420 can be regarded as further comprising CRAN 440, BBU 442, and CCNC 412.

Allocator component 450 that can facilitate extending access from PCNC 422 via CCNC 412, for example to PRAN 434 via PCNC 424, to CRAN 440 via CCNC 412, or combinations thereof. Allocator component 450 can be a new component integrated into an existing carrier core network, for example, via inclusion in CCNC 412 or some other carrier core network component. Allocator component can receive information from a private entity, for example, via inputs communicated via PCNC 422, that can then be employed to determine programming of security, configuration, provisioning component(s), for example security, configuration, provisioning component(s) 343, etc. Allocator component 450 can simultaneously support one or more extensions of one or more private networks via CCNC 412, e.g., to PRAN 434, CRAN 440, combinations thereof, or combinations with other unillustrated network cores and their associated access components, e.g., RANs, etc.

Figure 5:
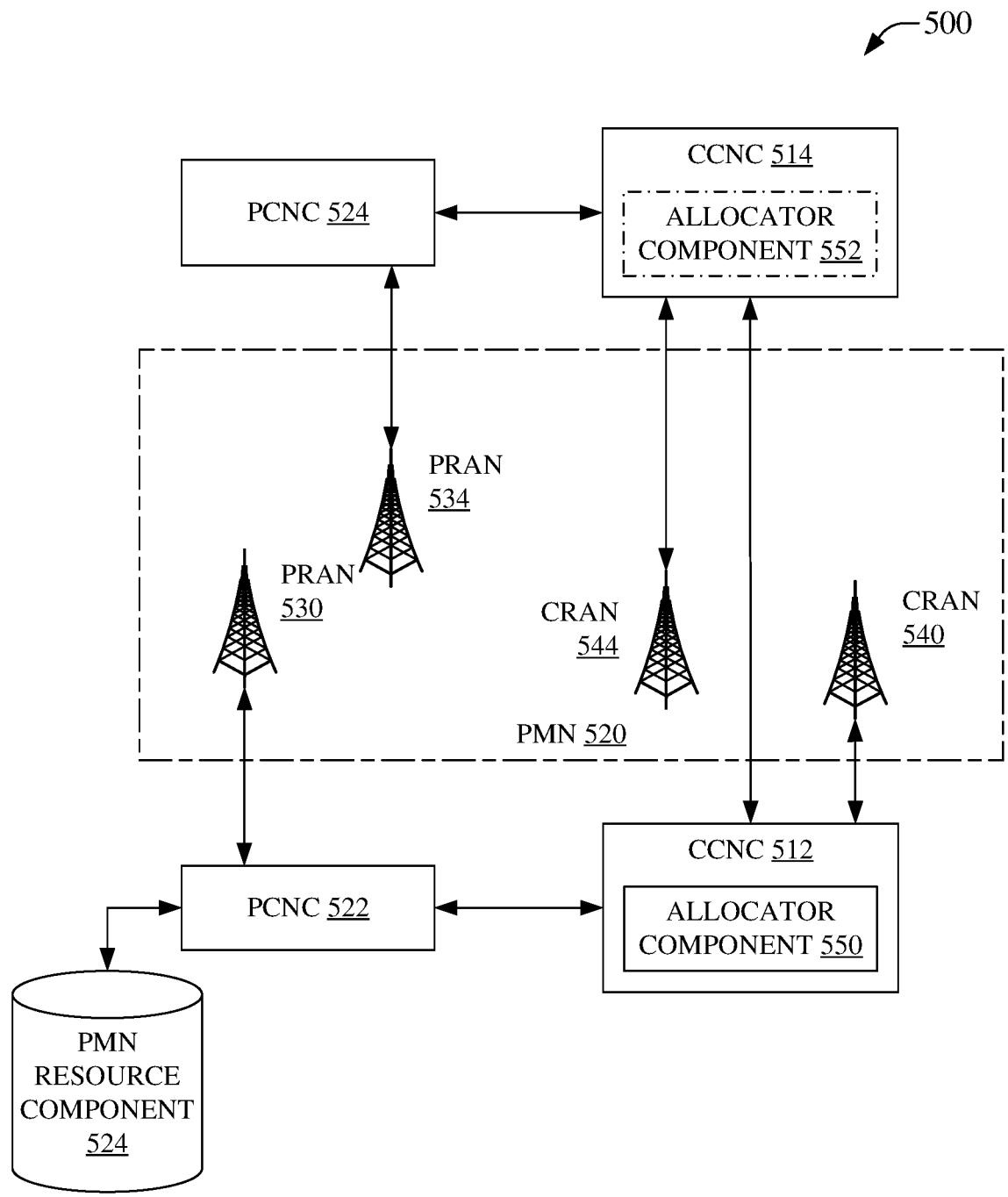
FIG. 5 illustrates an example system that can facilitate configurable extension of private mobile network access across or among different carrier core network components, in accordance with aspects of the subject disclosure.

FIG. 5 is an illustration of a system 500, which can support configurable extension of private mobile network access across or among different carrier core network components, in accordance with aspects of the subject disclosure. System 500 can comprise PCNC 522 that can be connected to PRAN 530. Similarly, system 500 can comprise PCNC 524 that can be connected to PRAN 534. A UE can access PCNC 524 via PRAN 530, PRAN 534, and/or CRAN 540, in accord with previously disclosed example embodiments. Resources can be accessed via PMN resource component 524 that can be connected to PCNC 522, e.g., via an unillustrated connection implemented by allocator component 550, wherein the unillustrated connection can connect PCNC 524 to PCNC 522 via CCNC 512, see for example system 400. PMN resource component 524, in some embodiments, can be comprised in PCNC 522, while in other embodiments, PMN resource component 524 can be located local to PCNC 522 or remotely from PCNC 522. Accordingly access to resources via PMN resource component 524 can have been extended via CCNC 512 by allocator component 550 and PMN 520 can be regarded as comprising PRAN 530, 534, and CRAN 540.

System 500 can further comprise CCNC 514 that can be connected to CRAN 544 and can be connected to CCNC 512. CCNC 512 can further expand access to resources at PMN resource component 524 via CRAN 544 by requesting compliant connectivity to CRAN 544 via CCNC 514, as determined by allocator component 550. In this regard, CRAN 544 can be further considered to be comprised in PMN 520 in relation to extending access to resources at PMN resource component 524. Moreover, allocator component 550 can update a connection between PCNC 524 and CCNC 512, for example, to terminate the aforementioned unillustrated connection between PCNC 524 and CCNC 512 in favor of connecting PCNC 524 to CCNC 514 which is in turn connected to CCNC 512. As an example, where the aforementioned unillustrated connection between PCNC 524 and CCNC 512 is not as fast as a connection between CCNC 514 and CCNC 512 that can, for example, be comparatively large carrier core components connected by a high-speed backbone, then it can be favorable to update the connectivity of PCNC 524 to route it through CCNC 514.

In embodiments, CCNC 512 and 514 can be operated by the same carrier entity or can be operated by different carrier entities. An example of a same carrier entity can be two regional network cores for a same carrier, such as an East coast network core and a West coast network core. An example of different carrier entities can be CCNC 512 operated by Carrier A and CCNC 514 being operated by Carrier B. In this example, it is noted that a UE can then access PMN resource component 524 via two different carriers, e.g., via CRAN 544 and CRAN 540.

Allocator component 550 can facilitate extending access from PCNC 522 via CCNC 512, for example to PRAN 534, CRAN 540, CRAN 544, etc. Allocator component 550 can be a component integrated into an existing carrier core network, for example, via inclusion in CCNC 512 or some other carrier core network component. Allocator component can receive information from a private entity, for example, via inputs communicated via PCNC 522, that can then be employed to determine programming of security, configuration, provisioning component(s), for example security, configuration, provisioning component(s) 343, etc. Allocator component 550 can simultaneously support one or more extensions of one or more private networks via CCNC 512.

Allocator component 552, for example comprised in CCNC 514, can also facilitate extending access from PCNC 522 via CCNC 514, for example to PRAN 534, CRAN 540, CRAN 544, etc. Allocator component 552, can be a second allocator component, for example a regional allocator component, an allocator component of a different carrier network, etc. Allocator component 522 can cooperate with allocator component 550 to determine, implement, maintain, update, etc., connection that can extend access to resources corresponding to PCNC 522. In an example, Carrier A can operate CCNC 512 and allocator component 550, while Carrier B can operate CCNC 514 and allocator component 552. In this example, Carriers A and B can have cooperative agreements such that allocator components 550 and 552 can share information to facilitate determining, establishing, maintain, adapting, etc., connectivity that can extend access to PMN resource component 524. In another example, Carrier A can operate both CCNC 512 and 514, and correspondingly, allocator components 550 and 554. In this example, allocators components 550 and 554 can also share information, for example between different distinct regions of service for Carrier A, to facilitate determining, establishing, maintain, adapting, etc., connectivity that can extend access to PMN resource component 524. In a further example, Allocator component 550 can determine, establish, maintain, adapt, etc., connectivity in the absence of allocator component 552, which is indicated by the dot-dash outline of allocator component 552. In other embodiments, allocator component 552 can be employed in the absence of allocator component 550. As before, allocator component(s) 550, 552, etc., can receive information from a private entity, for example, via inputs communicated via PCNC 522, that can then be employed to determine programming of security, configuration, provisioning component(s), for example security, configuration, provisioning component(s) 343, etc. Allocator component(s) 550, 552, etc., can each simultaneously support one or more extensions of one or more private networks via CCNCs 512, 514, etc.

Figure 6:
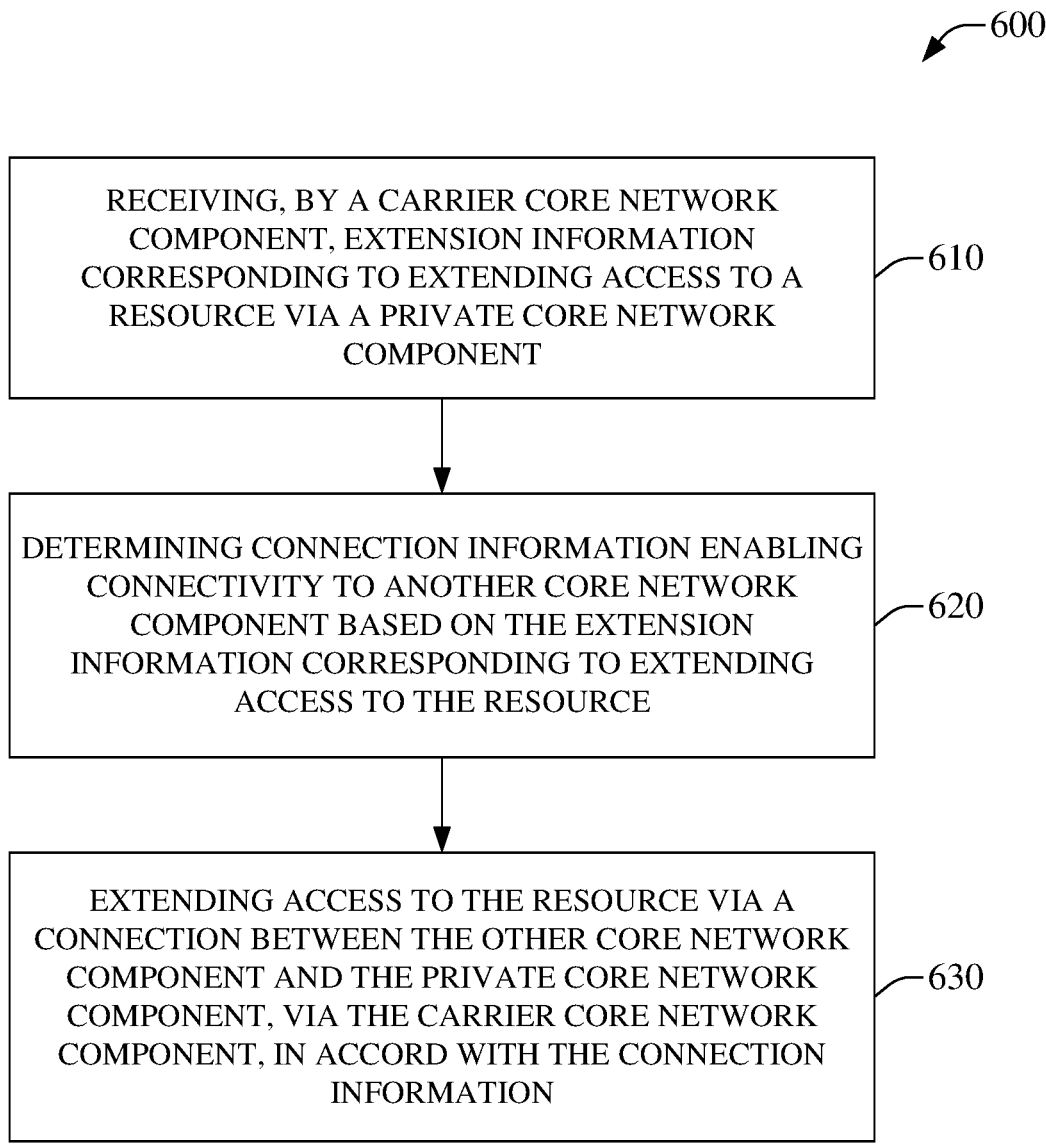
FIG. 6 is an illustration of an example method, enabling configurable extension of private mobile network access, in accordance with aspects of the subject disclosure.
Figure 7:
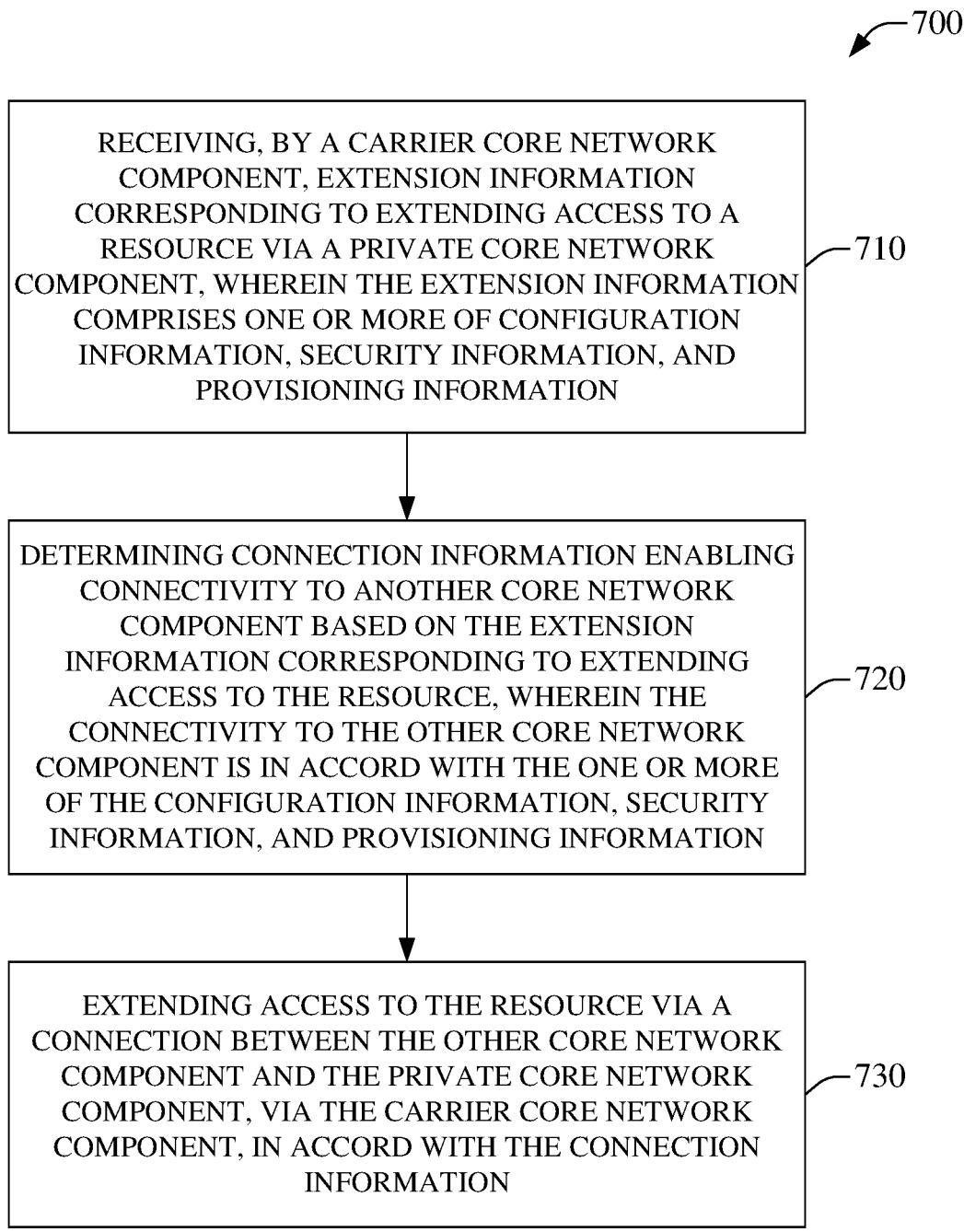
FIG. 7 illustrates an example method, facilitating enabling extension of private mobile network access supporting a customizable configuration, in accordance with aspects of the subject disclosure.
Figure 8:
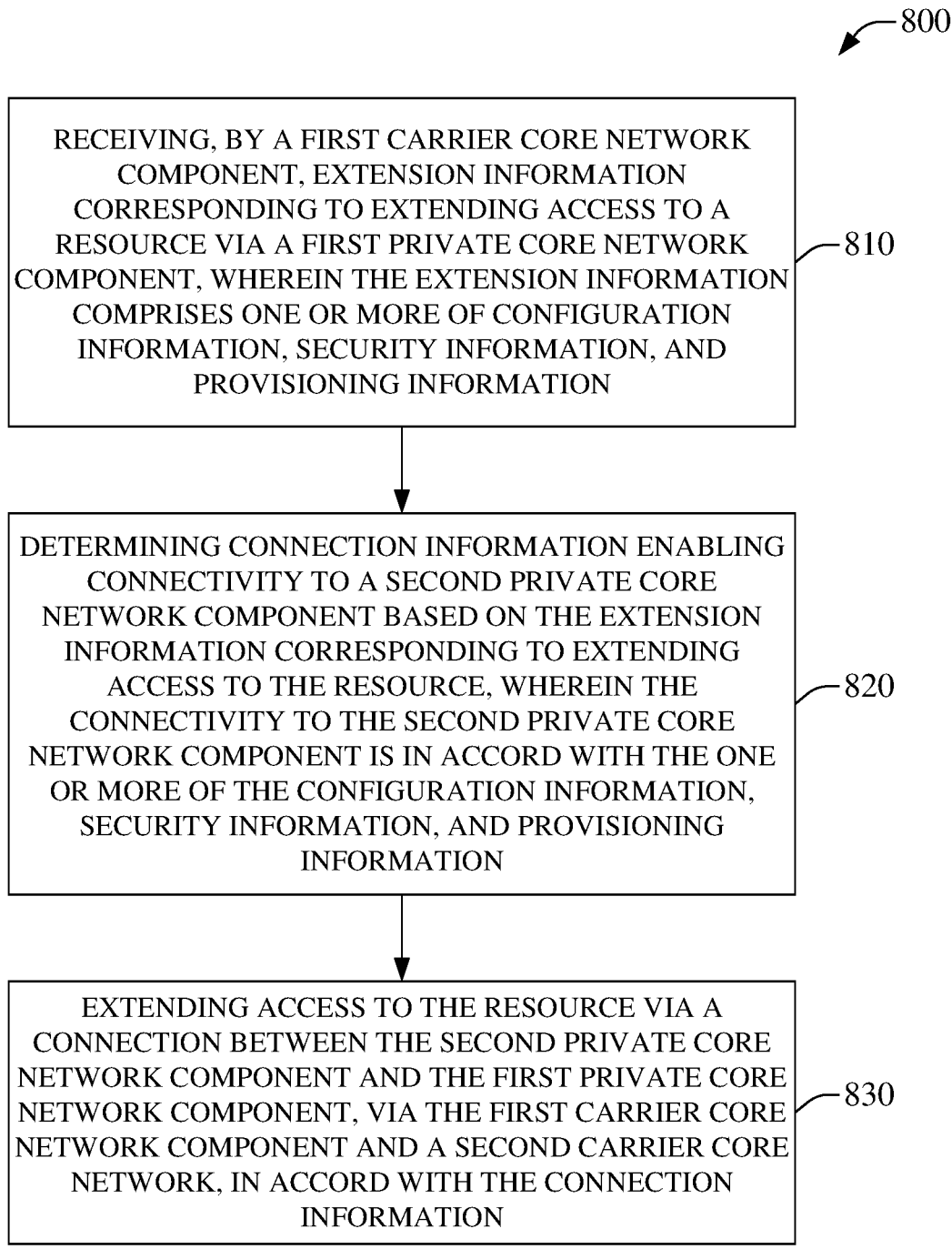
FIG. 8 illustrates an example method, enabling configurable extension of private mobile network access between and/or across different carrier core network components, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate enabling configurable extension of private mobile network access, in accordance with aspects of the subject disclosure. At 610, method 600 can comprise receiving, by a carrier core network component, extension information corresponding to extending access to a resource via a private core network component. As previously noted, a network operated by a carrier can typically be considered a public network and thus, the core network components can correspondingly be considered public in contrast to privately operated networks and their corresponding core network components that can be considered non-public. Access to a resource of a private network can be limited by a private entity operating a network, e.g., a private entity can apply rules or criteria that can limit access to resources accessible via a private network. Generally, the resources of a private network are not accessible via network components that lack hard connections to a private core network component that can be wirelessly connected to a UE, e.g., a UE on a public network is generally restricted from accessing a resources of a private network where the public network lacks a hard connection to a private core network component. This typically results in establishing dedicated hard connections, e.g., optical fiber or wired connections between different core network components and a private core network component to facilitate access to a resource of a private core network. As an example, a first private core network component can be connected to a second private core network component to enable a UE connected to the second private core network component to access resources of the first private core network component. In a second example, a private core network component can be connected to a carrier core network component to enable a UE connected to the carrier core network component to access resources of the private core network component. However, implementing hard connections between core networks has historically been complicated, slow, expensive, inefficient, and time consuming due to typically relying on human actors to determine or select a best hard connection, implement restrictions designated by a private network entity to access of the resource, etc. A new core network component, e.g., an allocator component, can allow a core network to review more possible hard connections, rank, order, or sort, the possible connections based on cost, efficacy, reliability, etc., and automatically provision a selected hard connection in accord with private network rules and criteria, typically without human intervention and in a manner that can be more thorough, efficient, and faster than would be possible with human actors. Additionally, the use of an allocator component can facilitate updating, adapting, altering, etc., hard connections between core network components with similarly higher efficacy, consideration of many more permutations, increased selection speeds and implementation speeds, etc., than where a human actor is tasked with implementing a change to a hard connection. The allocator component can be appreciated as improving the private network itself by facilitating extension of the private network through other networks in an improved manner to conventional technologies, e.g., a human just cannot perform the same level of hard connection evaluation, ranking, selection, and implementation as a allocator component. An allocator component can be located at a carrier core network component and can extract connection selection criteria, rules, provisioning characteristics, security requirements, etc., from extension information related to extending access to a resource via a private core network component.

Method 600, at 620, can comprise determining connection information enabling connectivity to another core network component based on the extension information corresponding to extending access to the resource. A carrier core network component, e.g., via an allocator component of a carrier core network, can determine connection information to another core network component. The other core network component can be, for example, another private core network component, a carrier core network component, etc. There can be many already existing hard connection permutations to the other core network component and the allocator component can facilitate evaluation of these numerous hard connection permutations, e.g., many hard connection routes can exist between core network components and the allocator component can facilitate evaluating which connection routes satisfy selection criteria, selection rules, etc. As an example, a first private core network component can be located in Boston, a second private core network component can be located in Sacramento, a first route can comprise a backbone network through Alberta, Canada, while a second route can comprise another backbone network through Dallas. In this example, a rule can indicate that a selected hard connection does not exit the United States and the allocator component can then exclude the example first route. Where there can a vast number of possible routes between the first and second private network components, evaluation and selection of a preferred route, for example by ranking possible routes, can result in selection of a preferred route that satisfies rules/criteria specified for the route. The use of the allocator component can greatly increase, over conventional techniques, the number of routes considered and the speed at which those routes can be ranked/ordered for selection of a preferred route. Moreover, the use of the allocator component can enable consideration of more criteria/rules when evaluating and ranking possible routes in comparison to conventional techniques.

At 630, method 600 can comprise extending access to the resource via a connection between the other core network component and the private core network component, via the carrier core network component, in accord with the connection information. At this point, method 600 can end. A selected connection can satisfy selection rules and can be a preferred route between the private core network component and the other core network component. An allocator component can extend the access to the resource of the private core network component via the selected route. In this regard, a selected route can be provisioned and implemented to establish a hard connection between the private core network component and the other core network component. In embodiments, the selected route can comprise one or more connections between one or more nodes, e.g., the selected connection can route through one or more nodes of a transport network, via one or more interconnected transport networks, etc. As examples, a first private core network component can connect to a second core network component via a carrier core network component, via two carrier core network components, via a first carrier and a second carrier's core network components, etc.

FIG. 7 illustrates example method 700 that facilitates extension of private mobile network access supporting a customizable configuration, in accordance with aspects of the subject disclosure. Method 700, at 710, can comprise receiving, by a carrier core network component, extension information corresponding to extending access to a resource via a private core network component, wherein the extension information comprises one or more of configuration information, security information, and provisioning information. Connection selection criteria, rules, provisioning characteristics, security requirements, etc., can be determined from the extension information to enable extending access to a resource via a private core network component.

Method 700, at 720, can comprise determining connection information enabling connectivity to another core network component based on the extension information corresponding to extending access to the resource, wherein the connectivity to the other core network component is in accord with the one or more of the configuration information, security information, and provisioning information. A carrier core network component can determine connection information to another core network component that can be a carrier core network component or a private core network component. Connection information can be based on evaluation of a hard connection route to the other core network component. Connection information can therefore reflect a selected hard connection route between the private core network component and the other core network component to extend access via the selected hard connection route to the other core network component, wherein the selected hard connection can have been determined to satisfy selection criteria, selection rules, etc. As an example, connection information can be employed to update an existing hard connection between the private core network component and the other core network component to alter the group of UE identifiers that are permitted to access the resource of the private core network component, e.g., the selected route can be updated to comprise an element that can filter out UEs that are not approved for access to the resource.

At 730, method 700 can comprise extending access to the resource via a connection between the other core network component and the private core network component, via the carrier core network component, in accord with the connection information. At this point, method 700 can end. The connection can satisfy selection rules and can be a preferred route between the private core network component and the other core network component. Access to the resource can be extended via the selected route and the extending can comprise provisioning and implementing the connection, in accord with the connection information, between the private core network component and the other core network component.

FIG. 8 illustrates example method 800 enabling configurable extension of private mobile network access between and/or across different carrier core network components, in accordance with aspects of the subject disclosure. Method 800, at 810, can comprise receiving, by a first carrier core network component, extension information corresponding to extending access to a resource via a first private core network component, wherein the extension information comprises one or more of configuration information, security information, and provisioning information. Connection selection criteria, rules, provisioning characteristics, security requirements, etc., can be determined from the extension information to enable extending access to a resource via a private core network component.

Method 800, at 820, can comprise determining connection information enabling connectivity to a second private core network component based on the extension information corresponding to extending access to the resource, wherein the connectivity to the second private core network component is in accord with the one or more of the configuration information, security information, and provisioning information. A carrier core network component can determine connection information to the second private core network component. Connection information can be based on evaluation of a hard connection route to the second private core network component. Connection information can therefore reflect a selected hard connection route between the first and second private core network components to extend access via the selected hard connection route to the other core network component, wherein the selected hard connection can have been determined to satisfy selection criteria, selection rules, etc. As an example, a university can implement a private network for their students at a main campus, wherein the private network can comprise the first private core network component. In this example, the university can desire to extend access to main campus network services to a satellite university campus. Connection information can be used to implement a preferred connection between the main campus and the satellite campus core network components, for example, via a carrier core network component, etc., wherein the selected route can be in accord with rules, criteria, and provisioning characteristics designated by the university in this example.

At 830, method 800 can comprise extending access to the resource via a connection between the second private core network component and the first private core network component, via the first carrier core network component and a second carrier core network, in accord with the connection information. At this point, method 800 can end. The connection can satisfy selection rules and can be a preferred route between the private core network components via the core network components. Access to the resource can be extended via the selected route and the extending can comprise provisioning and implementing the connection, in accord with the connection information, between the private core network component and the other core network component. In embodiments, the first and second core network components can be operated by a same carrier. In other embodiments, the first and second core network components can be operated by a different carriers.

Figure 9:
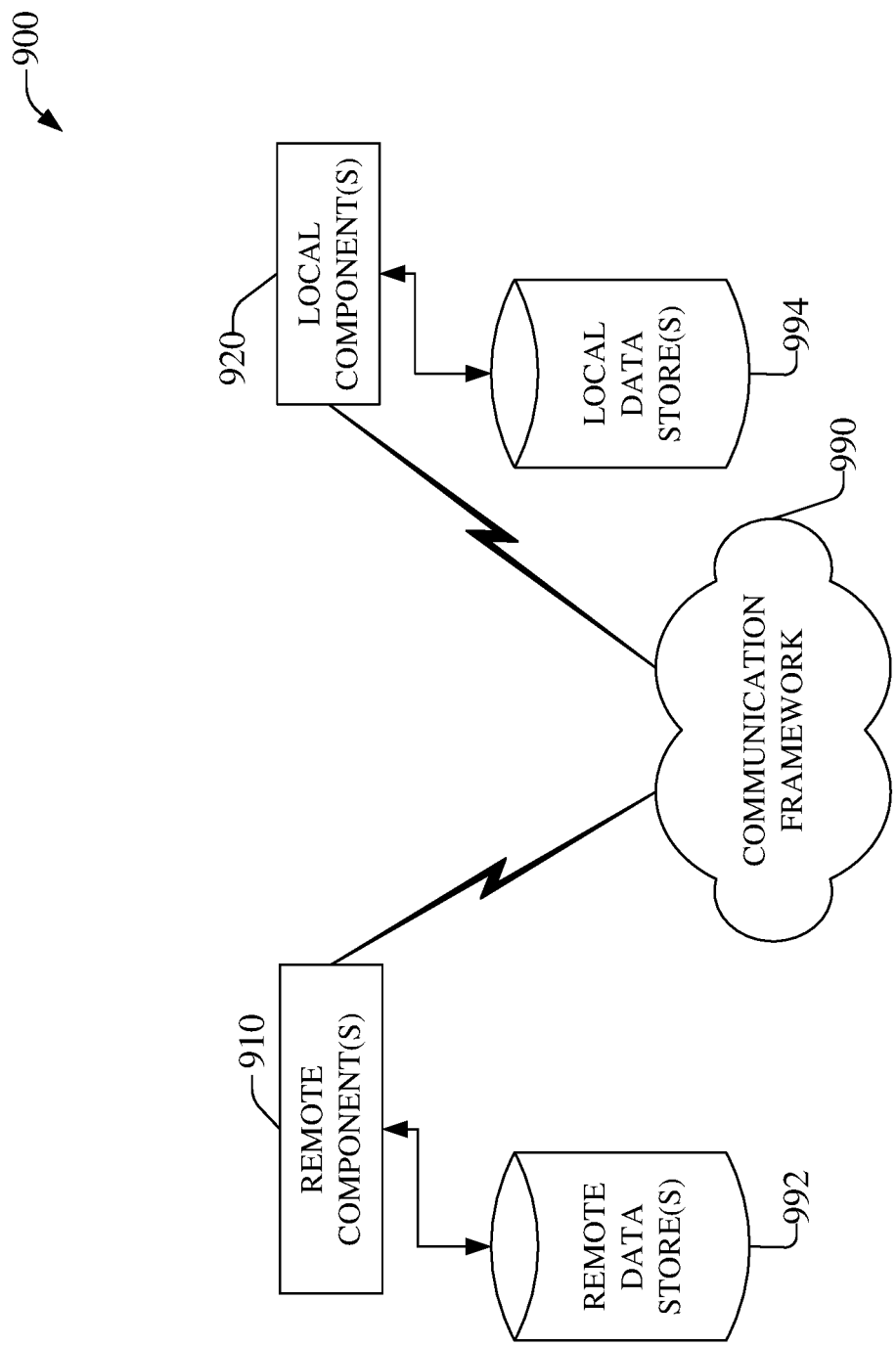
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise PCNC 122, 222, 322, 324, 422, 424, 522, 524, etc., CCNC 112, 212, 312, 412, 512, 514, etc., PMN resource component 224, 324, 424, 524, etc., or any other component that is located remotely from another component of systems 100-500, etc.

The system 900 also comprises one or more local component(s) 920. The local component(s) 920 can be hardware and/or software (e.g., threads, processes, computing devices). In some embodiments, local component(s) 920 can comprise PCNC 122, 222, 322, 324, 422, 424, 522, 524, etc., CCNC 112, 212, 312, 412, 512, 514, etc., PMN resource component 224, 324, 424, 524, etc., or any other component that is located local to another component of systems 100-500, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 992, such as a hard drive, solid state drive, SIM card, device memory, etc., that can be employed to store information on the remote component(s) 910 side of communication framework 990. Similarly, local component(s) 920 can be operably connected to one or more local data store(s) 994, that can be employed to store information on the local component(s) 920 side of communication framework 990. As examples, security information, UE authentication information, provisioning information, route selection information, configuration information, etc., or other information that can facilitate configurable extension of private mobile network access, can be stored on a local data store 994, etc., or remote data store 992, etc., and be communicated between components of systems 100-500 via communication framework 990, etc.

Figure 10:
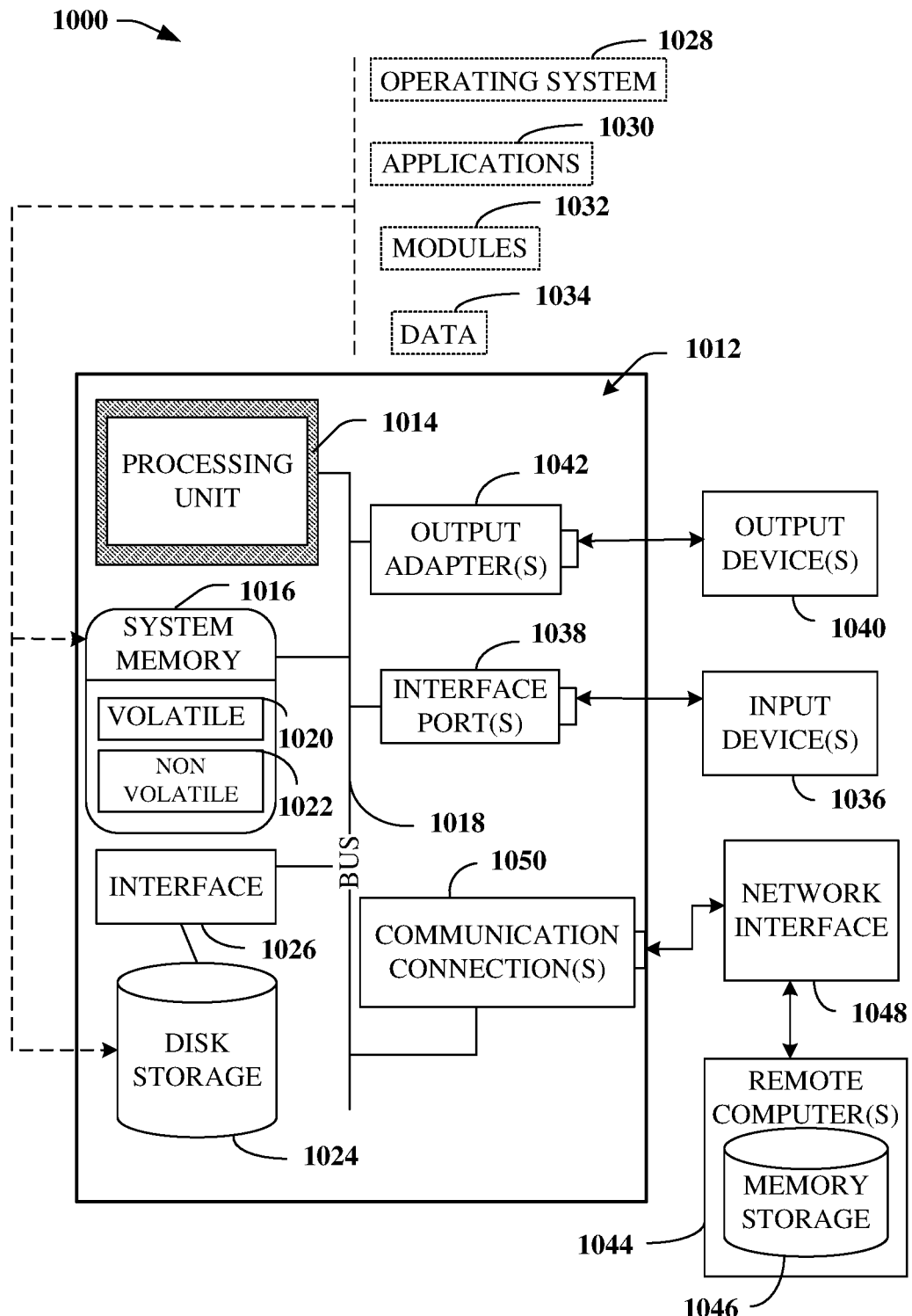
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in network core component 110-510, etc., RAN component 120, 320-520, etc., AP component 120-520, etc., data store(s) 592, 992, 994, etc., UE 102, 104, etc., or any other component that is located local with another component of systems 100-500, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory, or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory, or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries, or other data retrieval protocols, for a variety of operations with respect to the information stored by the medium. As such, for example, a computer-readable medium can comprise executable instructions stored thereon that, in response to execution, can cause a system comprising a processor to perform operations comprising receiving extension information at an allocation component of a carrier core network, wherein the extension information indicates an extension criterion for a connection between a first private core network component and another core network component to facilitate extending access to a resource corresponding to the first private core network component, and wherein the other core network component is selected from core network components comprising the carrier core network component and a second private core network component. Further, the operations can comprise generating connection information to facilitate establishing a selected connection to enable access to the resources via the other core network component and the first private core network component, wherein the selected connection is selected from possible connections between the first private core network component and the other core network component based on the extension information. As such, the operations can additionally comprise establishing the connection between the first private core network component and the other core network component based on the connection information resulting in extending access to the resource corresponding to the first private core network component via a radio access network connected to the other core network component.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring, and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); sixth generation partnership project (6G or 6GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer", or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
receiving extension information at a carrier core network component of public mobile network, wherein the extension information indicates an extension value related to extending access to a resource via a private core network component of a non-public mobile network;
determining, based on the extension information, connection information enabling implementation of a connection between the private core network component and a core network component, other than the private cores network component, to facilitate the access to the resource via the core network component and the private core network component; and
causing the implementation of the connection between the private core network component and the core network component based on the connection information, wherein the connection complies with the extension value.

2. The device of claim 1, wherein the extension value is specified by an operator of the non-public mobile network.

3. The device of claim 1, wherein the extension value corresponds to determining permission for a user equipment to access the resource via the core network component.

4. The device of claim 1, wherein the extension value corresponds to a security measure to implement relative to accessing the resource via the core network component.

5. The device of claim 1, wherein the extension value corresponds to a provisioning characteristic of the connection between the private core network component and another core network component to facilitate the access to the resource.

6. The device of claim 1, wherein the carrier core network component is a conventional carrier core network component, and wherein the receiving of the extension information at the conventional carrier core network component comprises receiving the extension information at an allocator component that has been added to the conventional carrier core network component.

7. The device of claim 1, wherein the core network component is a carrier core network component, and wherein the connection between the private core network component and the carrier core network component facilitates the access to the resource via a carrier radio access network connected to the carrier core network component.

8. The device of claim 1, wherein the private core network component is a first private core network component, wherein the core network component is a second private core network component, and wherein the connection between the first private core network component and the second private core network component is via the carrier core network component, extending the access to the resource to be via the second private core network component.

9. The device of claim 1, wherein the private core network component is a first private core network component, wherein the core network component is a second private core network component, wherein the connection between the first private core network component and the second private core network component is via the carrier core network component, extending the access to the resource to be via the second private core network component, and wherein the connection being via the core network component further extends the access to the resource to be via a radio access network affiliated with the core network component.

10. The device of claim 1, wherein the private core network component is a first private core network component, wherein the core network component is a second private core network component, wherein the carrier core network component is a first carrier core network component, and wherein the connection between the first private core network component and the second private core network component is via the first carrier core network component and the second core network component, extending the access to the resource to be via the second private core network component.

11. The device of claim 10, wherein the first carrier core network component is operated by a first carrier entity, and wherein second core network component is operated by a second carrier entity that is a different carrier entity than the first carrier entity.

12. The device of claim 10, wherein the first carrier core network component is operated by a first carrier entity, and wherein second core network component is operated by a second carrier entity that is a same carrier entity as the first carrier entity.

13. The device of claim 1, wherein the private core network component is a first private core network component, wherein the core network component is a second private core network component, wherein the carrier core network component is a first carrier core network component, wherein the connection between the first private core network component and the second private core network component is via the first carrier core network component and the second core network component, extending the access to resource to be via the second private core network component, and wherein the connection being via the first core network component further extends the access to the resource to be via a radio access network affiliated with the first core network component.

14. The device of claim 1, wherein the private core network component is a first private core network component, wherein the core network component is a second private core network component, wherein the carrier core network component is a first carrier core network component, wherein the connection between the first private core network component and the second private core network component is via the first carrier core network component and the second core network component, extending the access to the resource to be via the second private core network component, wherein the connection being via the first core network component further extends the access to the resource to be via a first radio access network affiliated with the first core network component, and wherein the connection also being via the second core network component further extends the access to the resource to be via a second radio access network affiliated with the second core network component.

15. The device of claim 1, wherein the private core network component is a first private core network component, wherein the core network component is a second private core network component, and wherein the first and second private core networks are operated by a same private network entity.

16. The device of claim 1, wherein the private core network component is a first private core network component, wherein the core network component is a second private core network component, and wherein the first and second private core networks are operated by a different private network entities.

17. A method, comprising:
receiving, by carrier core network equipment comprising a processor, extension information indicating an extension parameter for a connection between first private core network equipment and second core network equipment to facilitate extending access to a resource via the first private core network equipment;
selecting, by the carrier core network equipment based on the extension information, a connection of possible connections between the first private core network equipment and the second core network equipment, the selecting resulting in a selected connection;
generating, by the carrier core network equipment based on the selected connection, connection information to facilitate establishing the selected connection to enable the access to the resource via the second core network equipment and the first private core network equipment; and
initiating, by the carrier core network equipment, implementation of the connection between the first private core network equipment and the second core network equipment based on the connection information.

18. The method of claim 17, wherein the second core network equipment is second private core network equipment, and wherein the initiating of the implementation of the connection between the first private core network equipment and the second private core network equipment results in connecting the second private core network equipment to the first private core network equipment via the carrier core network equipment.

19. A non-transitory machine-readable storage medium, comprising executable instructions that, when executed by a processor of a carrier core network system of a carrier core network, facilitate performance of operations, comprising:

receiving extension information at an allocator of the carrier core network system, wherein the extension information indicates an extension criterion for a connection between a first private core network system and a second core network system to facilitate extending access to a resource corresponding to the first private core network system, and wherein the second core network system is selected from core network systems comprising the carrier core network system and a second private core network system;

generating connection information to facilitate establishing the connection to enable the access to the resource via the second core network system and the first private core network system, wherein the connection was selected from possible connections between the first private core network system and the second core network system based on the extension information; and establishing the connection between the first private core network system and the second core network system based on the connection information resulting in extending the access to the resource corresponding to the first private core network system via a radio access network connected to the second core network system.

20. The non-transitory machine-readable storage medium of claim 19, wherein the second core network system is the second private core network system, and wherein the establishing of the connection between the first private core network system and the second private core network system results in connecting the second private core network system to the first private core network system via the carrier core network system and extending the access to the resource via the second private core network system, the carrier core network system, and the first private core network system.

* * * * *